US010916132B2

(12) United States Patent
Arshad et al.

(10) Patent No.: US 10,916,132 B2
(45) Date of Patent: Feb. 9, 2021

(54) VEHICLE DASH CAM SIGN READING

(71) Applicant: INTERNATIONAL BUSINESS MACHINES CORPORATION, Armonk, NY (US)

(72) Inventors: Waleed Arshad, Basingstoke (GB); Charlotte Bird, Lymington (GB); Elizabeth Bowen, Winchester (GB); Ashley Robertson, Chandler's Ford (GB); Caroline J. Thomas, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 15/820,814

(22) Filed: Nov. 22, 2017

(65) Prior Publication Data

US 2019/0156667 A1 May 23, 2019

(51) Int. Cl.
*G08G 1/0962* (2006.01)
*G01C 21/34* (2006.01)
(Continued)

(52) U.S. Cl.
CPC ..... *G08G 1/09623* (2013.01); *G01C 21/3415* (2013.01); *G01C 21/3492* (2013.01); (Continued)

(58) Field of Classification Search
CPC ............ G08G 1/09623; G01C 21/3415; G01C 21/3492; G06K 9/00818; G06K 9/00791; G06K 9/3258
(Continued)

(56) References Cited

U.S. PATENT DOCUMENTS 9,103,671 B1 * 8/2015 Breed .................. G01S 17/931
9,131,376 B2 9/2015 Bondesen et al.
(Continued)

FOREIGN PATENT DOCUMENTS

GB 2511750 B 7/2015

OTHER PUBLICATIONS

Garmin, "Garmin Dash Cam™ 20", Part No. 010-01311-10, printed on Jun. 13, 2017, pp. 1-3, https://buy.garmin.com/en-GB/GB/p/167831.

(Continued)

*Primary Examiner* — Isaac G Smith
(74) *Attorney, Agent, or Firm* — Michael A. Petrocelli

(57) ABSTRACT

A dash cam on a vehicle for reading signage and updating navigation of the vehicle. A detour is detected from a route using a navigation system in a vehicle. A video recording from a dash cam on the vehicle which is continuously recording as the vehicle is operated is reviewed, and the reviewing of the video recording is based on a time of the detour from the route. Signage of a road diversion on the video at a location of the detour is detected. The signage is assessed to determine a route change based on the road diversion, and the route change includes avoiding the location of the detour or a detour area. The navigation system is updated with the route change based on the signage and the road diversion. The updated navigation includes the avoiding of the location of the detour or the detour area.

17 Claims, 7 Drawing Sheets

(51) Int. Cl.
*G06K 9/00* (2006.01)
*G06K 9/32* (2006.01)

(52) U.S. Cl.
CPC ..... *G06K 9/00791* (2013.01); *G06K 9/00818* (2013.01); *G06K 9/3258* (2013.01)

(58) Field of Classification Search
USPC .......................................................... 701/414
See application file for complete search history.

(56) References Cited

U.S. PATENT DOCUMENTS

| | | | |
|---|---|---|---|
| 9,435,654 B2 | 9/2016 | Ibrahim et al. | |
| 9,524,597 B2 | 12/2016 | Ricci | |
| 9,552,726 B2 | 1/2017 | McGrath et al. | |
| 2016/0069703 A1 | 3/2016 | Nakano et al. | |
| 2016/0355182 A1* | 12/2016 | Remillard | B60W 30/14 |
| 2017/0314954 A1* | 11/2017 | Golding | G01C 21/3644 |
| 2018/0025235 A1* | 1/2018 | Fridman | G06K 9/00791 382/103 |
| 2019/0384294 A1* | 12/2019 | Shashua | G05D 1/0088 |

OTHER PUBLICATIONS

TomTom, "How does GPS work? How does my TomTom device work?", TomTom, portable GPS car navigation systems, Feb. 21, 2017, pp. 1-4, http://www.tomtom.com/howdoesitwork/page.php?ID=28&CID=8.

SRI International, "CTEXTract™ Video OCR", printed Jun. 13, 2017, pp. 1-3, https://www.sri.com/engage/products-solutions/contextract-video-ocr.

Waze, "Free Community-based Mapping, Traffic & Navigation App", printed Jun. 13, 2017, pp. 1-2, https://www.waze.com/about.

Mell et al., "The NIST Definition of Cloud Computing", Recommendations of the National Institute of Standards and Technology, Special Publication 800-145, Sep. 2011, 7 pages.

* cited by examiner

VEHICLE DASH CAM SIGN READING

BACKGROUND

The present disclosure relates to a method and system for reading signage and updating navigation using a dash cam on a vehicle.

Current satellite navigation systems can receive information regarding road closures from highway agencies and social input. However, many drivers of vehicles are unaware of a road closures due to local events, road maintenance or accidents. Further, navigation system may not have the most recent updates for local road closures. In some instances, highway agencies may not upload information regarding road closures resulting in navigations system not having such information available. Therefore, drivers of vehicles may not be alerted by a navigation system to a road closure.

SUMMARY

In one example, it would be advantageous for a computer to analyze dash cam footage to assess signage for uploading information for real time traffic data to update a navigation system and provide updated routing for a vehicle.

A method, system, and computer program product for using a dash cam on a vehicle for reading signage and updating navigation using a dash cam on a vehicle is provided. A detour is detected from a route using a navigation system in a vehicle. A video recording from a dash cam on the vehicle which is continuously recording as the vehicle is operated is reviewed, and the reviewing of the video recording is based on a time of the detour from the route. Signage of a road diversion on the video at a location of the detour is detected. The signage is assessed to determine a route change based on the road diversion, and the route change includes avoiding the location of the detour or a detour area. The navigation system is updated with the route change based on the signage and the road diversion. The updated navigation includes the avoiding of the location of the detour or the detour area.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
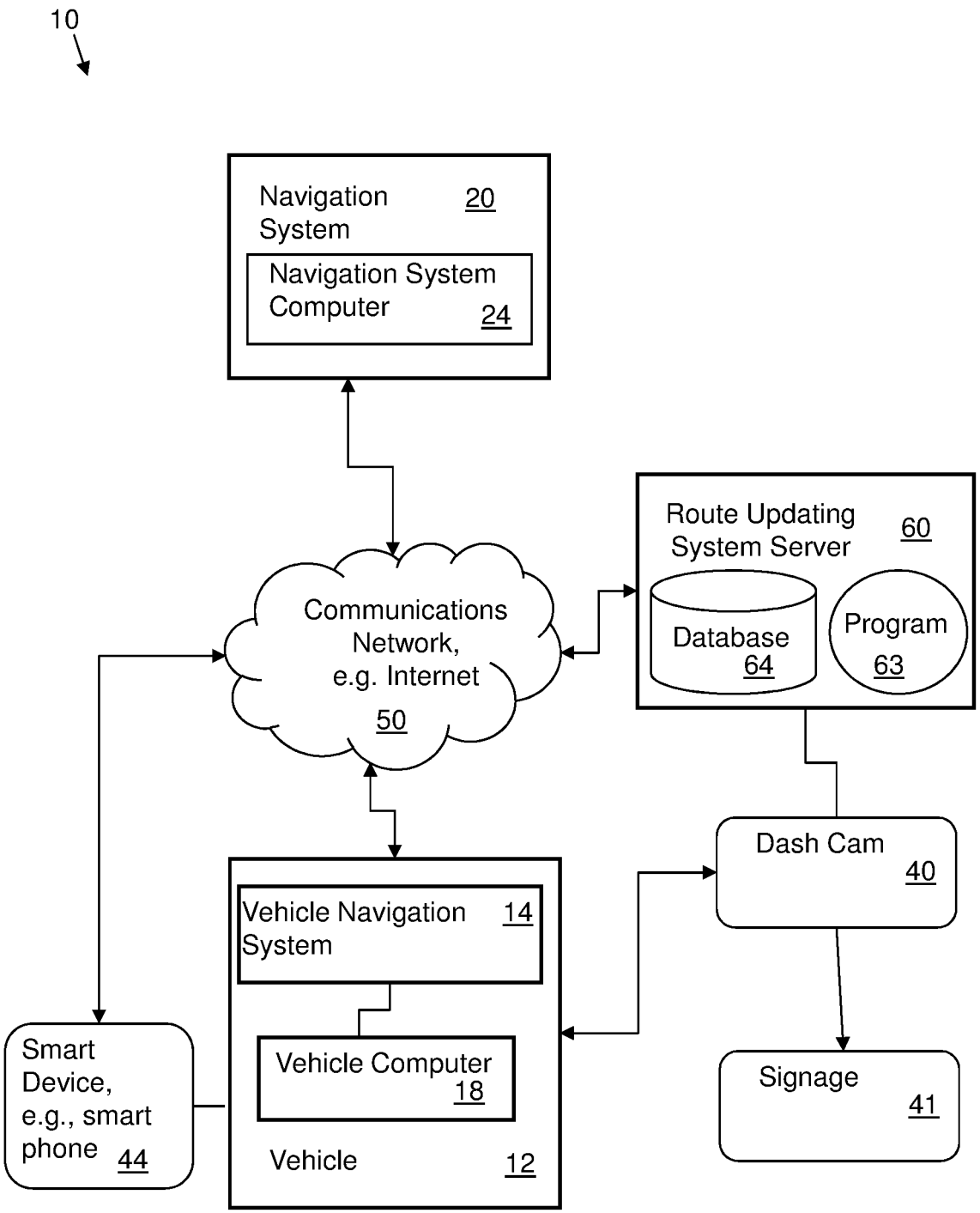
FIG. 1 is a schematic block diagram illustrating an overview of a system and methodology for using a dash cam on a vehicle for reading signage and updating navigation of the vehicle, according to an embodiment of the disclosure.
Figure 2A:
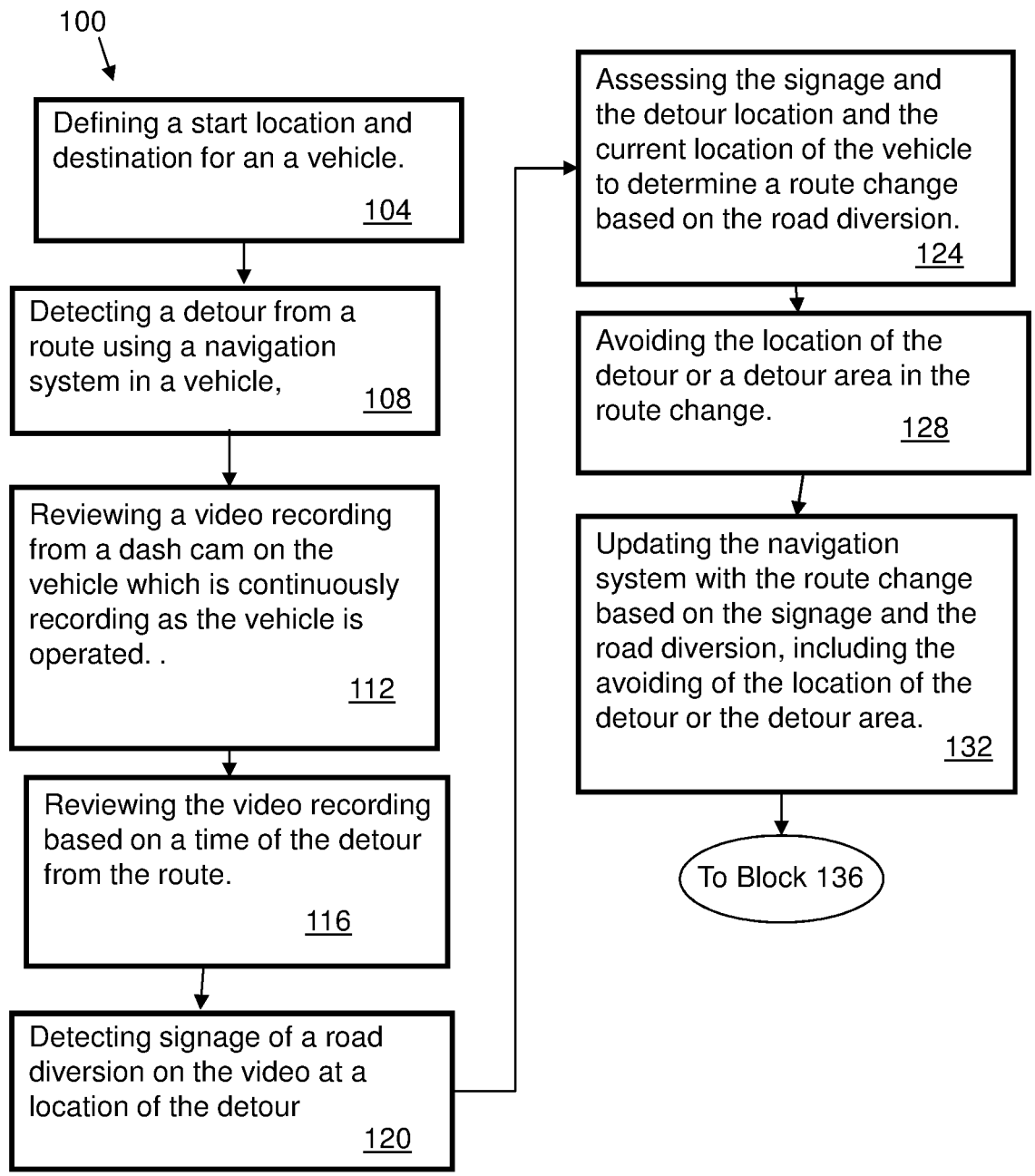
FIG. 2A is a flow chart illustrating a method, implemented using the system shown in FIG. 1, for using a dash cam on a vehicle for reading signage and updating navigation of the vehicle, according to an embodiment of the disclosure.
Figure 3:
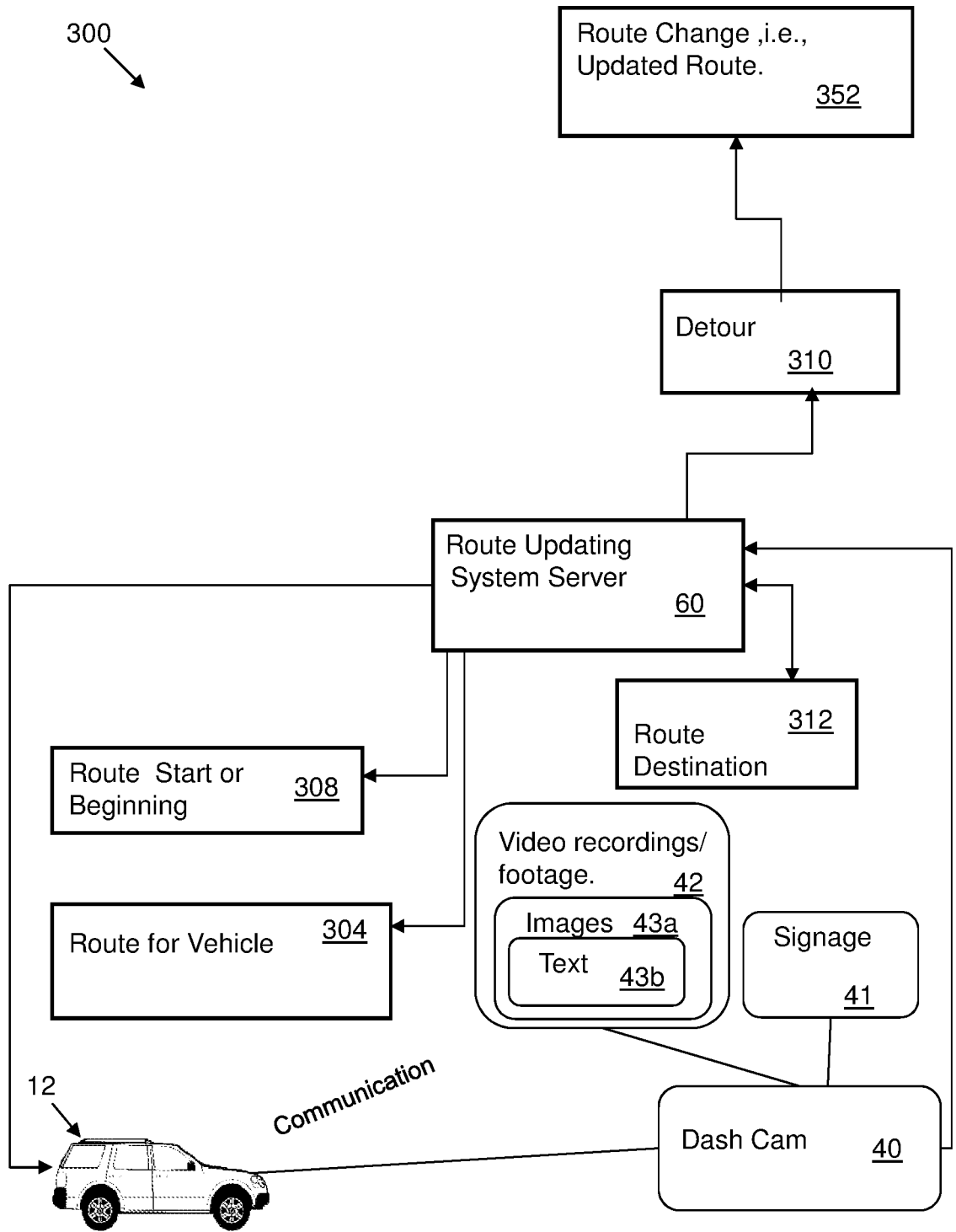
FIG. 3 is a functional block diagram depicting a system for using a dash cam on a vehicle for reading signage and updating navigation of the vehicle according to the method and system shown in FIGS. 1, 2A, and 2B according to an embodiment of the disclosure.

Referring to FIGS. 1, 2A, and 3, a method 100 with reference to a system 10 according to an embodiment of the present disclosure is provided for using a dash cam 40 on a vehicle 12 for reading signage 41 and updating navigation for the vehicle using the dash cam on the vehicle. The dash cam is understood to include dashboard cameras or onboard cameras for recording through a vehicle windshield.

The method 100, can be embodied in a computer program. The program can be embodied and implemented on a smart device 44 such as a smart phone (for example, a cell phone or a personal data assistant (PDA)). In general, as a vehicle route is updated according to the present disclosure, the smart device can be updated and update a navigation route provided by a navigation system 20. Alternatively, the program 63 can be on a server 60 communicating with the smart device and/or a vehicle navigation system 14 (communicating with a vehicle computer 18) of the vehicle 12 to update a route provided by a navigation system. The server 60 can include a database 64 for storing images 43a and text 43b, e.g., from dash cam footage 42 and data regarding a road closure. In another alternative, the program can be part of a navigation system 20 (which can include a computer 24) or communicating with a navigation system to upload images of signage 41 from the dash cam, initiate a route change based on the images, and provide a route change based on the images from the dash cam to the smart device or a vehicle navigation system. In the presently described embodiment shown in FIG. 1, the method of the present disclosure is generically shown and described as part of a route updating system server 60, which communicates with other components of the system 10.

The method includes defining a start location 308 and a destination 312 for the vehicle 12, as in block 104. The method 100 includes detecting a detour 310 from a route 304 using the navigation system 20 in the vehicle 12, as in block 108. In describing the method 100 and system 10 of the present disclosure, reference is also made to a functional or operational schematic block diagram depicting a functional system 300 in FIG. 3, which elaborates on the system 10 shown in FIG. 1.

A video recording or video footage 42 is reviewed from a dash cam 40 on the vehicle which is continuously recording as the vehicle is operated, as in block 112. The reviewing of the video recording is based on a time of the detour from the route, as in block 116. For example, the video can be reviewed before and after the time of the vehicle detour as such time would be most likely to result in capturing any detour signs or road closure signage 41.

In the review of the video 42, the method detects signage 41 of a road diversion on the video at a location of the detour based on the time of the detour from the route, as in block 120. For example, text 43b in the images 43a can be identified. The text can be analyzed for information referring to the road diversion, and the navigation system can be updated based on the text information.

The signage is assessed and the detour location and the current location of the vehicle are assessed to determine a route change or updated route 352 based on the road diversion, at block 124. The route change includes avoiding the location of the detour or a detour area, as in block 128.

The method includes updating the navigation system with the route change based on the signage and the road diversion, including the avoiding of the location of the detour or the detour area, as in block 132.

In one embodiment, the navigation system can be updated by multiple vehicle users wherein the multiple vehicle users also each have dash cams and update the navigation system as their vehicle pass the location of the detour or the detour area. In this way, the navigation system can monitor the detour location and be updated as to the continuance of the detour and when the detour is absent.

Thereby, the location of the detour location is monitored using other dash cams on a plurality of respective vehicles, and a determination is made as to when the road diversion is absent. Thereafter, the navigation system can be updated that the route change is unnecessary and to not implement the route change.

For example, once the navigation system has been notified of a detour area or location, as other vehicles pass the detour area which are in communication with the navigation system, those subsequent vehicles can update the navigation system with current video footage 42 from a respective dash cam. Further, subsequent vehicles can continue to update the navigation system. Such updates can continue until the detour is not detected by not being identified in current video footage 42 from dash cams.

Figure 2B:
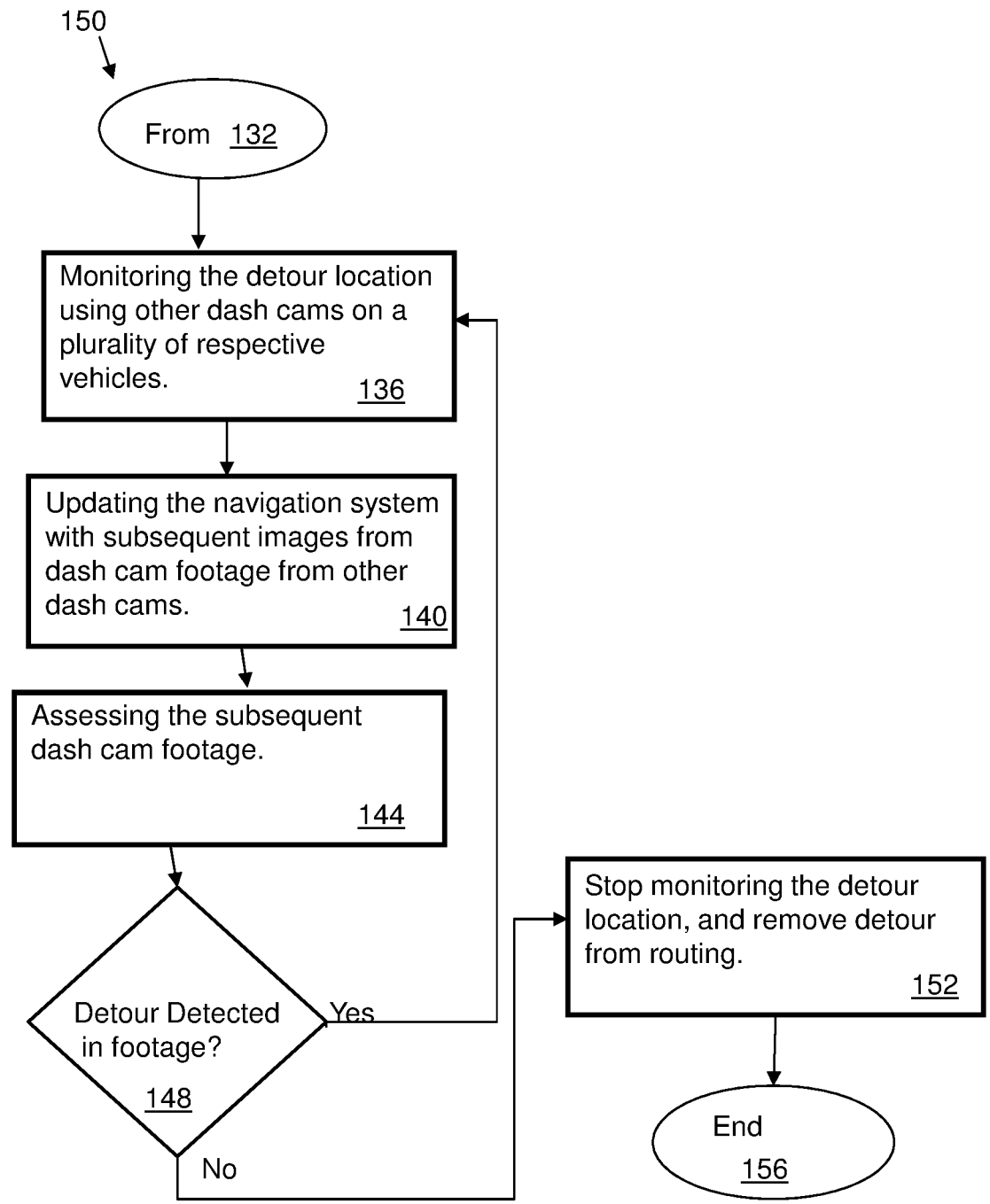
FIG. 2B is a flow chart continuing the method from FIG. 2A.

Referring to FIG. 2B, a method 150 continues from block 132 of the method 100. The method 150 includes monitoring the detour location using other dash cams on a plurality of respective vehicles, at block 136.

Subsequent images 43a update the navigation system from the dash cam footage 42 from the other vehicles, as in block 140. The subsequent dash cam footage is assessed (at block 144) to determine if the detour remains (decision block 148). When the detour remains active, the method continues at block 136 to monitor the detour location. When the detour is no longer detected at the detour location, the method continues to block 152 to stop monitoring the detour location and remove the detour from subsequent routing, and the method ends 156.

In one embodiment, the dash cam can be linked to a smartphone. The method of the present disclosure can be implemented using the smart phone. In another embodiment, the dash cam can be linked to the smartphone which updates the navigation system. In another embodiment the dash cam can be lined to a car computer which communicates with the navigation system.

Thus, as described in the embodiments of the present disclosure, in one example, a driver of a vehicle can set one or more destinations on a smart phone which uses a GPS (Global Positioning System). As the driver follows the route as provided by the navigation system, a dash cam, which can be linked to the smartphone via wireless communication, can continually record footage of the road ahead.

When the driver encounters a road closure on their predefined route and is forced to take a diversion, the navigation system recognizes the driver has switched routes and it re-routes them.

At this point it will also capture the time stamp at which the driver diverted routes, and it will request the footage from the dash cam for the 30 seconds either side of the diversion taking place. The video footage can be sent from the dash cam to the smartphone via wireless communication.

The smartphone can use video analysis techniques to analyze the footage for text. In other examples, a remote computer system, or a navigation system can perform the analysis via a communications network 50.

If text is recognized, the smartphone can upload the text along with a location and a time stamp of the diversion to a server. The server can analyze the text and look for key words such as road closures and dates, to try and find a reason as to why the driver diverted. If the analysis finds road closure information, the server can update its system accordingly, and communicate this information with a navigation system.

The navigation system can then update routing information to no longer direct drivers down the closed road or along a route with the closed road.

Additionally, the navigation system can continually monitor the closed road via additional drivers passing by the location to detect if the road remains closed. The monitoring can include a rule that any vehicles passing this location point can provide dash cam video and analysis can be performed of additional video clips for text, for example, having a time limit of one minute, or thirty seconds, etc., to ascertain if the road is still closed.

Another analysis can be implemented to determine if any vehicles are proceeding through the detour location or area, without reviewing dash cam footage, as an indicator that the road Is open. The system can also analyze dash cam footage for text to detect reopening dates that may be present.

Thereby the embodiments of the present disclosure includes a car navigation system that can determine a user has diverted from a predefined route, and based on such diversion retrieves images from camera/dash cam for a specified duration on either or both sides of the time of duration. Analyses of the images identify text and further analysis determines finding information referring to a potential road closures/road work and dates of such. A navigation system can update directions to avoid the road closure/road works in the future or for a duration of time specified in the analyzed text. Images of the location or detour area can be monitored when subsequent drivers pass the location with dash cams. The navigation system and direction, e.g., routes can be updated wen the road closure/road works are determined to have been finished or completed.

Figure 4:
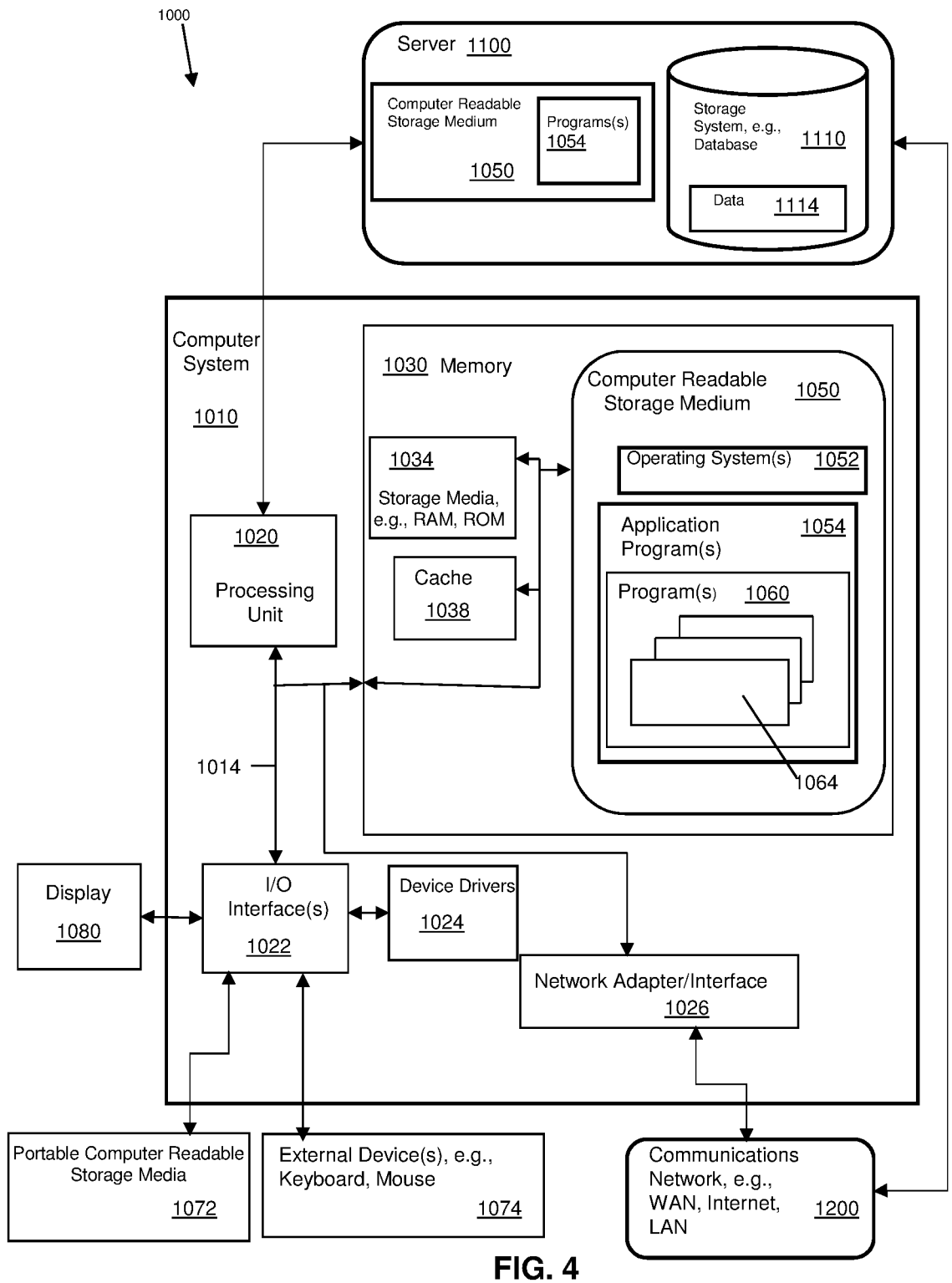
FIG. 4 is a schematic block diagram depicting a generic computer system according to an embodiment of the disclosure which can, all or in part, represent one or more computers shown in FIG. 1, and cooperates with the systems and methods shown in FIGS. 1, 2A, and 3.

One or more computers discussed in the system 10, such as the navigation system computer, the vehicle computer, a smart device computer, or a updating system server, can include all or part of a computer system 1000 and computer 1010 shown in FIG. 4, which discloses a generic computer system 1000 and computer 1010. It is understood that the above disclosed computers/computer systems and the computer 1010 are representative or illustrative of many alternative computer devices and are presented here as generic representations for the purposes of the embodiments of the present invention. In the embodiment discussed above, for illustrative purposes, the method of the present disclosure can be embodied in a computer program 1060 (FIG. 4) or a software application stored on the computer 1010. The computer 1010 can all or in part represent the server 60. The server 60, in FIG. 4, is shown as a remote server to the vehicle 12, the smart device 44, and the navigation system 20, however, in other embodiment in accordance with the present disclosure, a computer program embodying the present method can be part of a computer system running locally in one or more of the illustrated components of the system 10 shown in FIG. 1 (as was discussed hereinabove). Further, a computer program embodying the present method can be cloud based or part of a cloud environment. In one embodiment such a cloud based system or environment can include all or part of the computer system 1000 (FIG. 4) and cloud based environment components shown in FIGS. 5 and 6. Alternative embodiments can include a computer program stored remotely (for example, on a remote server 1100 (FIG. 4)), and, for example, can be implemented as a service.

Referring to FIG. 4, a system or computer environment 1000 includes a computer system 1010 shown in the form of a generic computing device. The method 100, for example, may be embodied in a program 1060 embodied on a computer readable storage device, for example, generally referred to as memory 1030 and more specifically, computer readable storage medium 1050. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 shown in FIG. 4 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 4 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 4, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 100 (FIG. 2A), and method 150 (FIG. 2B), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
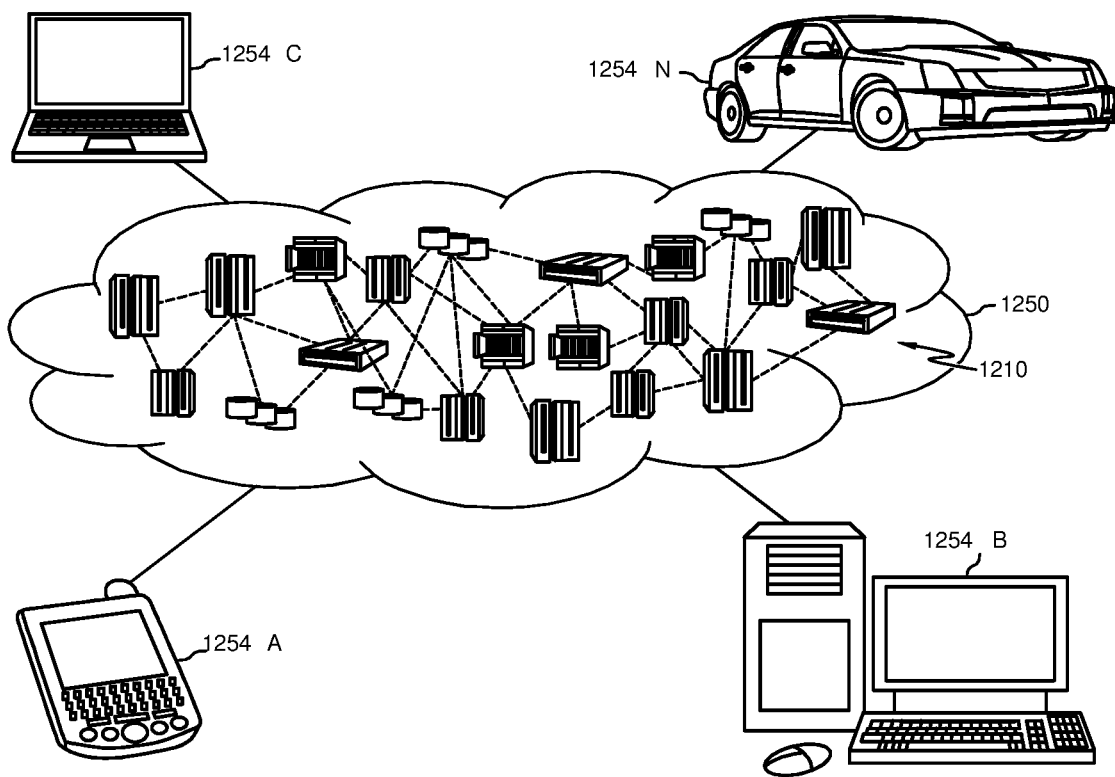
FIG. 5 is a functional block diagram depicting a cloud computing environment according to an embodiment of the present invention.

Referring now to FIG. 5, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 5 are intended to be illustrative only and that computing nodes 1210 and cloud computing environment 1250 can communicate with any type of computerized device over any type of network and/or network addressable connection (e.g., using a web browser).

Figure 6:
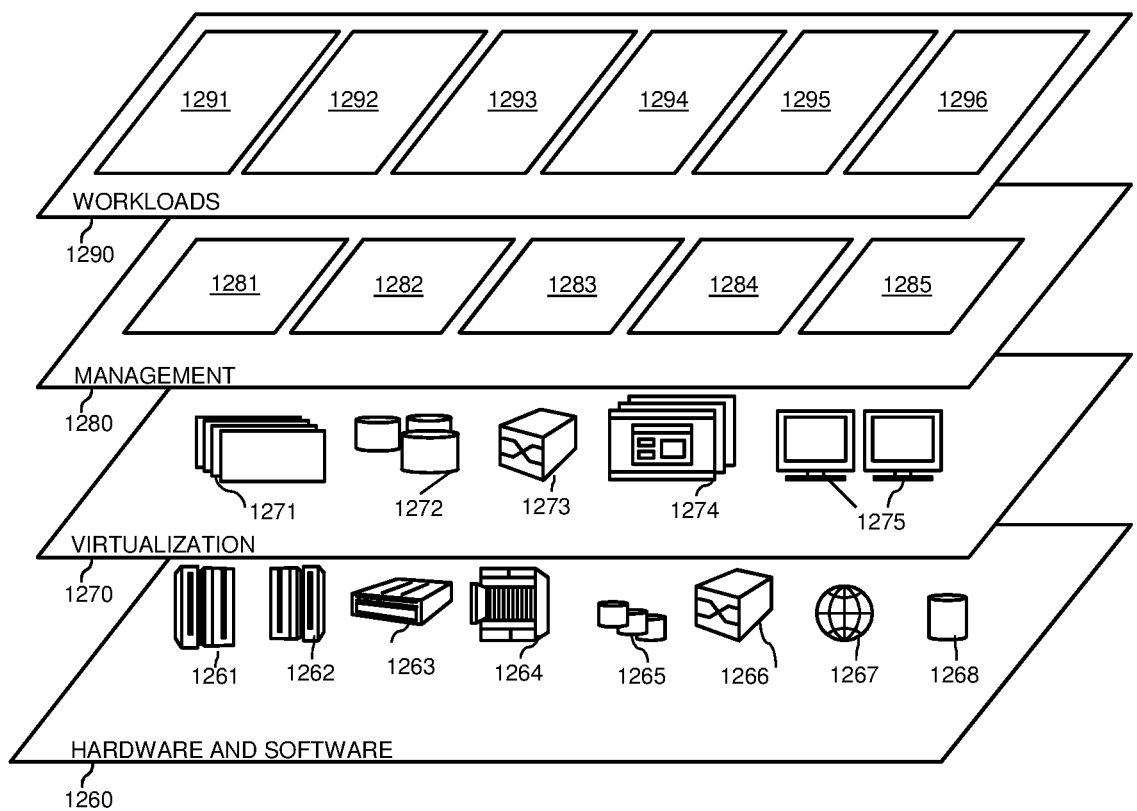
FIG. 6 is a diagram depicting abstraction model layers according to an embodiment of the present invention.

Referring now to FIG. 6, a set of functional abstraction layers provided by cloud computing environment 1250 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and assessing conditions and recommending modifications 1296.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for using a dash cam on a vehicle for reading signage and updating navigation of the vehicle, comprising:
   detecting a detour from a route using a navigation system in a vehicle, the route having a beginning location and a destination, and the navigation system receiving the beginning location and the destination from a computer communicating with the navigation system;

reviewing a video recording from a dash cam on the vehicle, using the computer, which is continuously recording as the vehicle is operated, the reviewing of the video recording being based on a time of the detour of the vehicle from the route, the dash cam being linked to the computer which communicates with the navigation system;

capturing a time stamp at which the vehicle detoured from the route, as at least part of the reviewing of the video recording based on the time of the detour;

requesting footage from the dash cam for a time period being before and after the time of the detour of the vehicle based on the captured time stamp;

detecting signage of a road diversion on the video at a location of the detour, based on the time of the detour, using the computer;

assessing the signage and assessing the detour location and a current location of the vehicle to determine a route change or updated route based on the road diversion, using the computer;

determining a route change including avoiding the location of the detour or a detour area, based on the road diversion;

communicating to the navigation system, using the computer, the route change based on the signage and the road diversion; and updating navigation routes using the navigation system to include the route change including the avoiding of the location of the detour or the detour area.

2. The method of claim 1, wherein the updating of the navigation routes includes input from a plurality of users of the navigation system.

3. The method of claim 1, further comprising:
monitoring the location of the detour using other dash cams on a plurality of respective vehicles.

4. The method of claim 1, further comprising:
monitoring the location of the detour using other dash cams on a plurality of respective vehicles;
determining when the road diversion is absent; and
updating the navigation system that the route change is unnecessary and to not implement the route change.

5. The method of claim 1, wherein the dash cam is linked to a smartphone which updates the navigation system.

6. The method of claim 1, wherein the dash cam is linked to a car computer which communicates with the navigation system.

7. The method of claim 1, further comprising:
identifying text in the images;
analyzing the text for information referring to the road diversion; and
updating the navigation system based on the text information.

8. A system for using a dash cam on a vehicle for reading signage and updating navigation of the vehicle, the system comprising:
a computer system comprising: a computer processor, a computer-readable storage medium, and program instructions stored on the computer-readable storage medium being executable by the processor, to cause the computer system to perform a method, comprising:
detecting a detour from a route using a navigation system in a vehicle, the route having a beginning location and a destination, and the navigation system receiving the beginning location and the destination from a computer communicating with the navigation system;

reviewing a video recording from a dash cam on the vehicle, using the computer, which is continuously recording as the vehicle is operated, the reviewing of the video recording being based on a time of the detour of the vehicle from the route, the dash cam being linked to the computer which communicates with the navigation system;

capturing a time stamp at which the vehicle detoured from the route, as at least part of the reviewing of the video recording based on the time of the detour;

requesting footage from the dash cam for a time period being before and after the time of the detour of the vehicle based on the captured time stamp;

detecting signage of a road diversion on the video at a location of the detour, based on the time of the detour, using the computer;

assessing the signage and assessing the detour location and a current location of the vehicle to determine a route change or updated route based on the road diversion, using the computer;

determining a route change including avoiding the location of the detour or a detour area, based on the road diversion;

communicating to the navigation system the route change based on the signage and the road diversion; and updating navigation routes using the navigation system to include the route change including the avoiding of the location of the detour or the detour area.

9. The system of claim 8, wherein the updating of the navigation routes includes input from a plurality of users of the navigation system.

10. The system of claim 8, further comprising:
monitoring the location of the detour using other dash cams on a plurality of respective vehicles.

11. The system of claim 8, further comprising:
monitoring the location of the detour using other dash cams on a plurality of respective vehicles;
determining when the road diversion is absent; and
updating the navigation system that the route change is unnecessary and to not implement the route change.

12. The system of claim 8, wherein the dash cam is linked to a smartphone which updates the navigation system.

13. The system of claim 8, wherein the dash cam is linked to a car computer which communicates with the navigation system.

14. The system of claim 8, further comprising:
identifying text in the images;
analyzing the text for information referring to the road diversion; and
updating the navigation system based on the text information.

15. A computer program product for using a dash cam on a vehicle for reading signage and updating navigation of the vehicle, the program instructions executable by a computer to cause the computer to perform a method, comprising:
detecting a detour from a route using a navigation system in a vehicle, the route having a beginning location and a destination, and the navigation system receiving the beginning location and the destination from a computer communicating with the navigation system;

reviewing a video recording from a dash cam on the vehicle, using the computer, which is continuously recording as the vehicle is operated, the reviewing of the video recording being based on a time of the detour of the vehicle from the route, the dash cam being linked to the computer which communicates with the navigation system;

capturing a time stamp at which the vehicle detoured from the route, as at least part of the reviewing of the video recording based on the time of the detour;

requesting footage from the dash cam for a time period being before and after the time of the detour of the vehicle based on the captured time stamp;

detecting signage of a road diversion on the video at a location of the detour, based on the time of the detour, using the computer;

assessing the signage and assessing the detour location and a current location of the vehicle to determine a route change or updated route based on the road diversion, using the computer;

determining a route change including avoiding the location of the detour or a detour area, based on the road diversion;

communicating to the navigation system, using the computer, the route change based on the signage and the road diversion; and updating navigation routes using the navigation system to include the route change including the avoiding of the location of the detour or the detour area.

16. The computer program product of claim 15, wherein the updating of the navigation route includes input from a plurality of users of the navigation system.

17. The computer program product of claim 15, further comprising:

monitoring the location of the detour using other dash cams on a plurality of respective vehicles.

* * * * *